United States Patent
Dell et al.

(10) Patent No.: US 9,600,189 B2
(45) Date of Patent: *Mar. 21, 2017

(54) BANK-LEVEL FAULT MANAGEMENT IN A MEMORY SYSTEM

(71) Applicant: International Business Machines Corporation, Armonk, NY (US)

(72) Inventors: Timothy J. Dell, Colchester, VT (US); Girisankar Paulraj, Bangalore (IN); Diyanesh B.Chinnakkonda Vidyapoornachary, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 316 days.

This patent is subject to a terminal disclaimer.

(21) Appl. No.: 14/301,611

(22) Filed: Jun. 11, 2014

(65) Prior Publication Data
US 2015/0363255 A1  Dec. 17, 2015

(51) Int. Cl.
*G11C 29/00* (2006.01)
*G06F 3/06* (2006.01)
(Continued)

(52) U.S. Cl.
CPC .......... *G06F 3/0619* (2013.01); *G06F 3/0653* (2013.01); *G06F 3/0683* (2013.01);
(Continued)

(58) Field of Classification Search
CPC ........ G11B 2020/1893; G11B 20/1883; G11B 2220/20; G11C 29/4401; G11C 29/44;
(Continued)

(56) References Cited

U.S. PATENT DOCUMENTS

| 5,327,548 A | 7/1994 | Hardell, Jr. et al. |
| 5,996,106 A * | 11/1999 | Seyyedy ................ G11C 29/10 365/189.05 |

(Continued)

FOREIGN PATENT DOCUMENTS

| CN | 102414669 A | 4/2012 |
| EP | 0398637 A2 | 11/1990 |

(Continued)

OTHER PUBLICATIONS

List of IBM Patents or Patent Applications Treated as Related; Oct. 6, 2014, 2 pages.

(Continued)

*Primary Examiner* — Albert Decady
*Assistant Examiner* — Enamul M Kabir
(74) *Attorney, Agent, or Firm* — Cantor Colburn LLP

(57) ABSTRACT

According to one aspect, bank-level fault management in a memory system is provided. The memory system includes a plurality of ranks, each rank including a plurality of memory devices each having a plurality of banks. A first error is detected in a first bank number of a first memory device of a rank. The first bank number of the first memory device is marked with a bank-level chip mark. The bank-level chip mark isolates declaration of an error condition to the first bank number. A bank-level fault management action is performed based on the bank-level chip mark to accommodate the error condition.

6 Claims, 7 Drawing Sheets

(51) Int. Cl.
*G06F 11/20* (2006.01)
*G06F 11/16* (2006.01)

(52) U.S. Cl.
CPC ...... *G06F 11/2094* (2013.01); *G06F 11/1666* (2013.01); *G06F 11/20* (2013.01)

(58) Field of Classification Search
CPC .. G06F 11/00; G06F 11/0793; G06F 11/0727; G06F 11/10; G06F 11/1076; G06F 11/1666; G06F 11/20; G06F 11/2094; G06F 3/06; G06F 3/0619; G06F 3/0653; G06F 3/0683
See application file for complete search history.

(56) References Cited

U.S. PATENT DOCUMENTS

| | | | |
|---|---|---|---|
| 2002/0188797 | A1 | 12/2002 | Hsu et al. |
| 2003/0009615 | A1 | 1/2003 | Hsu et al. |
| 2004/0003336 | A1* | 1/2004 | Cypher ............... G11C 29/42 714/763 |
| 2008/0270675 | A1* | 10/2008 | Nagaraj ............. G06F 12/0246 711/100 |
| 2009/0132876 | A1* | 5/2009 | Freking ............... G06F 11/106 714/723 |
| 2010/0162037 | A1* | 6/2010 | Maule ................. G06F 11/106 714/5.11 |
| 2010/0281227 | A1 | 11/2010 | Walker et al. |
| 2012/0131382 | A1* | 5/2012 | Higeta ............... G06F 11/0724 714/6.13 |
| 2012/0239996 | A1* | 9/2012 | Higeta ............... G06F 11/1048 714/746 |
| 2013/0227357 | A1* | 8/2013 | Goto .................. G06F 11/1658 714/49 |
| 2013/0326293 | A1* | 12/2013 | Muralimanohar ..... G11C 29/08 714/718 |
| 2013/0339820 | A1 | 12/2013 | Cordero et al. |
| 2014/0192583 | A1* | 7/2014 | Rajan ..................... G11C 7/10 365/63 |

FOREIGN PATENT DOCUMENTS

| | | |
|---|---|---|
| EP | 2270986 A1 | 1/2011 |
| WO | WO2010101754 A2 | 9/2010 |

OTHER PUBLICATIONS

U.S. Appl. No. 14/506,783, filed Oct. 6, 2014, Entitled: Bank-Level Fault Management in a Memory System, First Named Inventor: Timothy J. Dell.

Hwang, et al, "Cosmic Rays Don't Strike Twice: Understanding the Nature of DRAM Errors and the Implications for System Design," ACM SIGARCH Computer Architecture News 40, No. 1, pp. 111-122, Mar. 2013.

Sung et al., "Data Layout Transformation Exploiting Memory-Level Parallelism in Structured Grid Many-Core Applications," In Proceedings of the 19th International Conference on Parallel Architectures and Compilation Techniques, pp. 513-522. ACM, Sep. 2010.

Bossen, et al., "Fault Alignment Exclusion for Memory Using Address Permutation," IBM J. Res. Develop., vol. 28, No. 2, Mar. 1984, 7 pages.

List of IBM Patents or Patent Applications Treated as Related; Aug. 15, 2016, 2 pages.

U.S. Appl. No. 14/732,945, filed Jun. 8, 2015, Entitled: "Selective Error Coding," First Named Inventor: Diyanesh Babu Chinnakkonda Vidyapoornachary.

U.S. Appl. No. 14/835,790, filed Aug. 26, 2015, Entitled: "Selective Error Coding," First Named Inventor: Diyanesh Babu Chinnakkonda Vidyapoornachary.

* cited by examiner

BANK-LEVEL FAULT MANAGEMENT IN A MEMORY SYSTEM

BACKGROUND

The present invention relates generally to computer memory, and more particularly, to bank-level fault management in a memory system.

Computer systems often require a considerable amount of high speed random access memory (RAM) to hold information, such as data and programs, temporarily when a computer is powered and operational. This information is normally binary, composed of patterns of 1's and 0's known as bits of data. The bits of data are often grouped and organized at a higher level. A byte, for example, is typically composed of 8 bits; more generally these groups or bytes are called symbols and may consist of any number of bits or sub-symbols.

Memory device densities have continued to grow as computer systems have become more powerful. Currently it is not uncommon to have the RAM content of a single computer be composed of hundreds of trillions of bits. Unfortunately, the failure of just a portion of a single RAM device can cause the entire computer system to fail. When memory errors occur, which may be "hard" (repeating) or "soft" (one-time or intermittent) failures, these failures may occur as single cell, multi-bit, full chip or full memory module failures and all or part of the system RAM may be unusable until it is repaired. Repair turn-around-times can be hours or even days, which can have a substantial impact to a business dependent on the computer systems.

The probability of encountering a RAM failure during normal operations has continued to increase as the amount of memory storage in contemporary computers continues to grow. Techniques to detect and correct bit errors have evolved into an elaborate science over the past several decades. These error detection and error correction techniques are commonly used to restore data to its original/correct form in noisy communication transmission media or for storage media where there is a finite probability of data errors due to the physical characteristics of the device. Memory devices generally store data as voltage levels representing a 1 or a 0 in RAM and are subject to both device failure and state changes due to high energy cosmic rays and alpha particles.

Error-correcting codes (ECCs) are used in more robust systems and are typically collectively stored in an additional device to detect and correct specific error conditions. Memory devices (e.g., dynamic random access memory or DRAM devices) are often grouped as ranks on a module, such as dual inline memory module (DIMM). Each DRAM can internally include multiple banks and each rank includes multiple DRAMs. ECC decoding to detect and correct bit errors is typically supported at a DRAM per-rank granularity. In some cases, a single bit error may be identified and corrected by a code in the memory system. ECC decoders may also support error detection and correction of more than one bit. In some cases, multiple errors or failures at a selected point in time may not be identified and corrected, as error correction systems are typically unable to detect and/or correct more than certain number of bits at a time. Accordingly, in some cases when one or more chips of a rank fail or experience an error, the entire rank is taken offline or disabled to prevent the memory failures in that rank. This creates a hole in the available memory space and therefore would adversely affect the system performance.

SUMMARY

According to an embodiment, a memory system includes a plurality of ranks, each rank including a plurality of memory devices each having a plurality of banks. The memory system also includes a memory buffer device coupled to at least one of the ranks. The memory system is configured to detect a first error in a first bank number of a first memory device of a rank. The first bank number of the first memory device is marked with a bank-level chip mark. The bank-level chip mark isolates declaration of an error condition to the first bank number. A bank-level fault management action is performed based on the bank-level chip mark to accommodate the error condition.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment is directed to performing bank-level fault management in a memory system. In an embodiment, a system, logic, and/or method are used to control the detection and fault recovery of bank-level faults for internal bank divisions within memory devices. The memory devices can refer to memory chips, such as dynamic random access memory (DRAM) chips or dies within a three-dimensional structure, such as a memory cube. In embodiments, rather than using dedicated spare memory devices, error correction can be performed using one or more of an error-correcting code (ECC) decoder and bank steering. Memory devices can be grouped into ranks, where each rank defines a group of multiple memory devices that share a common chip select, such that they are collectively accessed across a memory bus that spans a width greater than a data width supported individually by each memory device. For example, a rank can include eight DRAM devices and an ECC device, where the ECC device is a type of memory device that stores ECC values to support error detection and correction. Each memory device includes addressable banks, where a typical memory access includes a same bank number accessed across all of the memory devices in a selected rank. Error detection and correction is typically performed at the rank level or device level. Exemplary embodiments provide bank-level fault management.

Ranks can be spread across different memory modules, such as dual inline memory modules (DIMMs). Each DIMM can include one or more ranks. Rank, memory device, and bank selection can be driven by a memory controller. The memory controller can be a stand-alone device, incorporated within or distributed between a processor and a memory buffer device. A memory buffer device can be located on a DIMM or on a planar assembly to convert processor requests into command and control signals to access memory devices and to perform error detection and correction. ECC or other known error correction codes may be used to detect and correct errors in words communicated to and from the memory device. For example, memory error correction codes (also referred to as "error control codes" or "ECCs") may use a combination of parity checks in various bit positions of a data word to allow detection and correction of errors. Every time data words are written into memory, these parity checks are generated and stored with the data. Upon retrieval of the data, an ECC decoder can use the parity bits together with the data message in order to determine whether there was an error and to proceed with error correction if feasible. In some cases, multiple bit errors above the correctable threshold limit may occur at a time, and the ECC may not be able to detect and correct all of the errors. Embodiments of a memory system and method for operation of the memory system provide for bank-level chip marking, bank steering, and bank callout to enable memory operation after an occurrence of one or more errors.

Figure 1:
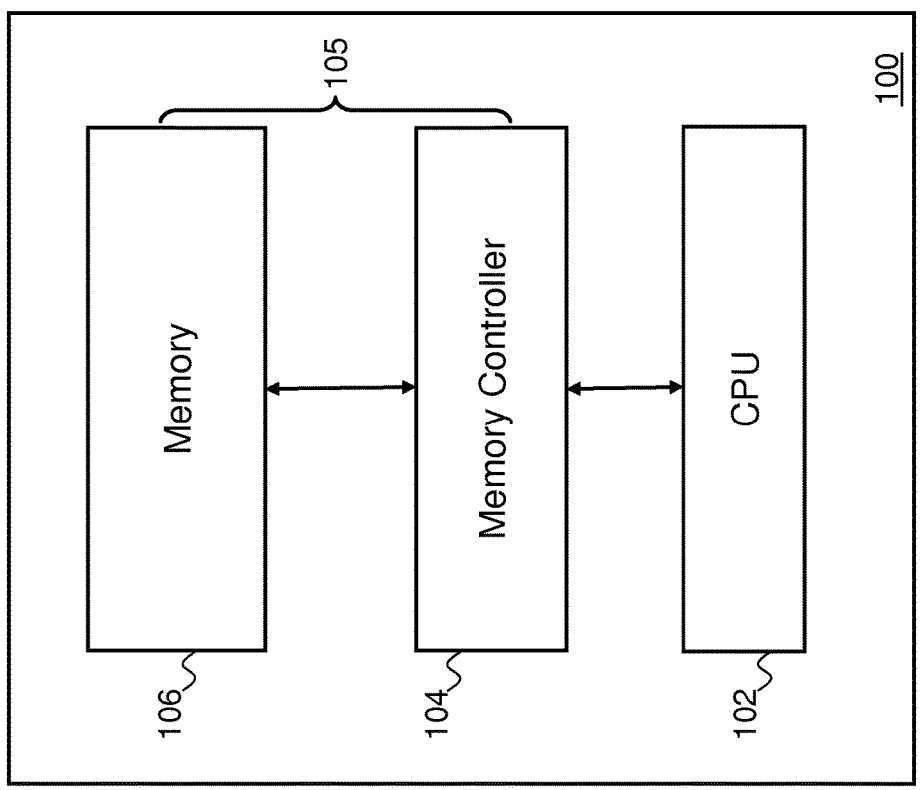
FIG. 1 illustrates a block diagram of a system operable to perform bank-level fault management in accordance with an embodiment.

FIG. 1 illustrates a block diagram of a system 100 operable to perform bank-level fault management in accordance with an embodiment. The system 100 depicted in FIG. 1 includes a computer processor 102, a memory 106 including multiple memory devices, and a memory controller 104 for receiving data from the computer processor 102 to be stored in the memory 106. Collectively, the memory controller 104 and the memory 106 are referred to as a memory system 105. In an embodiment, the memory devices are arranged into ranks, and each memory device includes multiple banks as further described herein.

In one embodiment the memory controller 104 is coupled to the computer processor 102 and receives write requests from the computer processor 102. The write requests contain data to be written to the memory 106 and a logical address for identifying the location in the memory 106 to which the data will be written. The memory controller 104 stores data at a physical address within the memory 106. In an embodiment, the memory controller 104 maps the logic address to a physical address in the memory 106 when storing or retrieving data.

The system 100 is one example of a configuration that may be utilized to perform the processing described herein. Although the system 100 has been depicted with only a memory 106, memory controller 104, and computer processor 102, it will be understood that other embodiments would also operate in other systems including additional elements, e.g., multiple computers processors 102 and multiple levels of memory 106. In an embodiment, the memory 106, memory controller 104, and computer processor 102 are not located within the same computer. For example, the memory 106 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, and computer processor 102.

Figure 2:
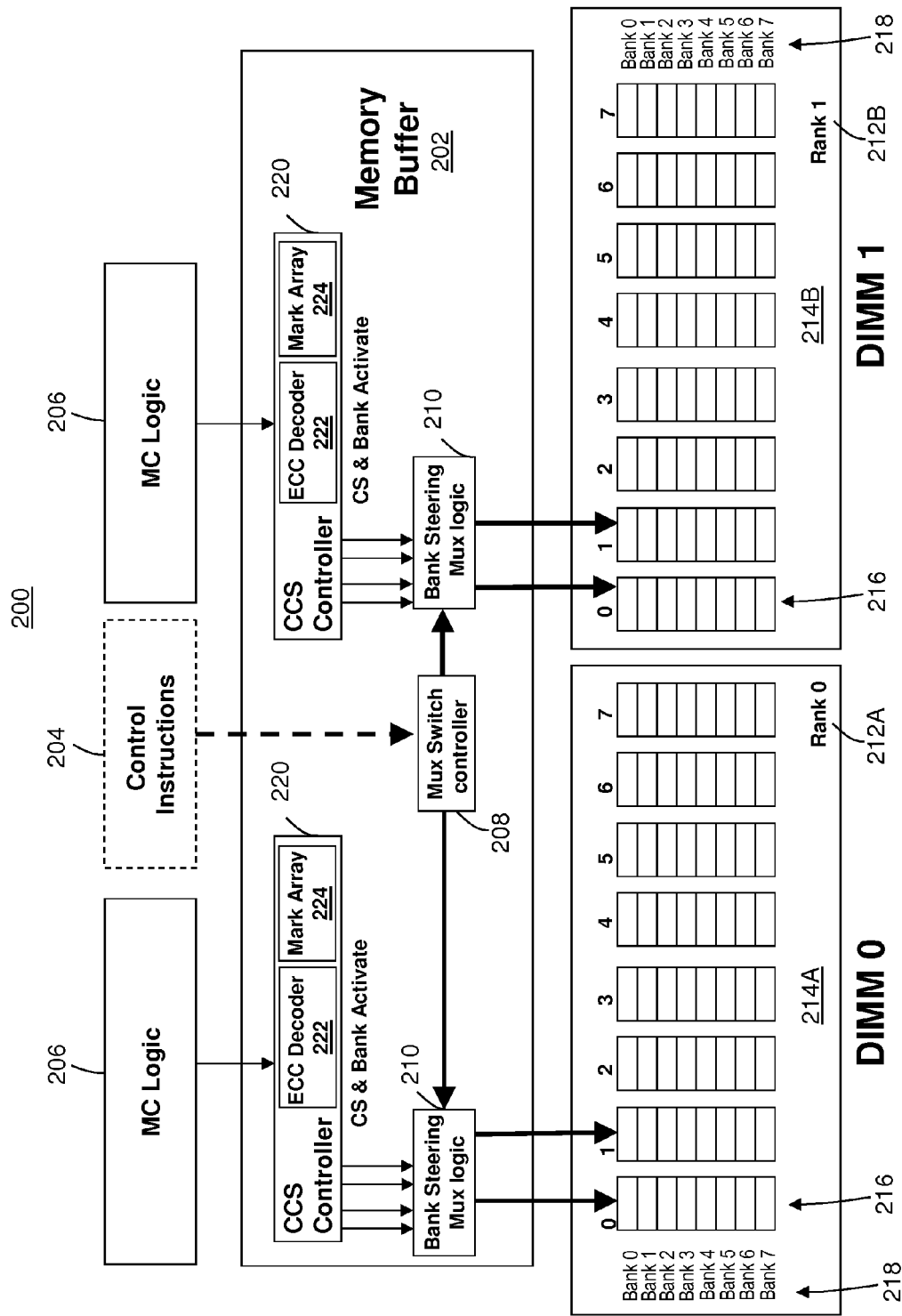
FIG. 2 illustrates a block diagram of a memory system operable to perform bank-level fault management in accordance with an embodiment.

FIG. 2 illustrates a block diagram of a memory system 200 operable to perform bank-level fault management in accordance with an embodiment. The memory system 200 is an embodiment of the memory system 105 of FIG. 1. In the example of FIG. 2, a memory buffer device 202 receives control commands from control instructions 204 and memory control logic 206. The memory buffer device 202 can be implemented as a processing circuit. The control instructions 204 may be firmware that drives a multiplexer (mux) switch controller 208 to control bank steering mux logic 210 of the memory buffer device 202, as well as other control aspects of the memory buffer device 202. The memory control logic 206 may reside in the computer processor 102 of FIG. 1 or the memory controller 104 of FIG. 1 to provide requested addresses and a data path to read and write data. The example of FIG. 2 also depicts a rank 212A on a first memory module 214A, and a second rank 212B on a second memory module 214B. Each of the ranks 212A and 212B includes a plurality of memory devices 216 that are further divided into a plurality of banks 218. The memory modules 214A and 214B may be DIMMs that include additional ranks and devices beyond those depicted in FIG. 2 and represent an embodiment of the memory 106 of FIG. 1.

The memory buffer device 202 can include one or more command control sequencer 220 that receives commands from the memory control logic 206 and generates chip select and bank activation signals for the bank steering mux logic 210. The command control sequencer 220 can also include an ECC decoder 222 and a mark array 224 to track errors at a rank level, chip level, and bank level. The bank steering mux logic 210 can enable bank steering between banks 218 on the same memory module 214 or between memory modules 214A and 214B as further described herein.

Figure 3:
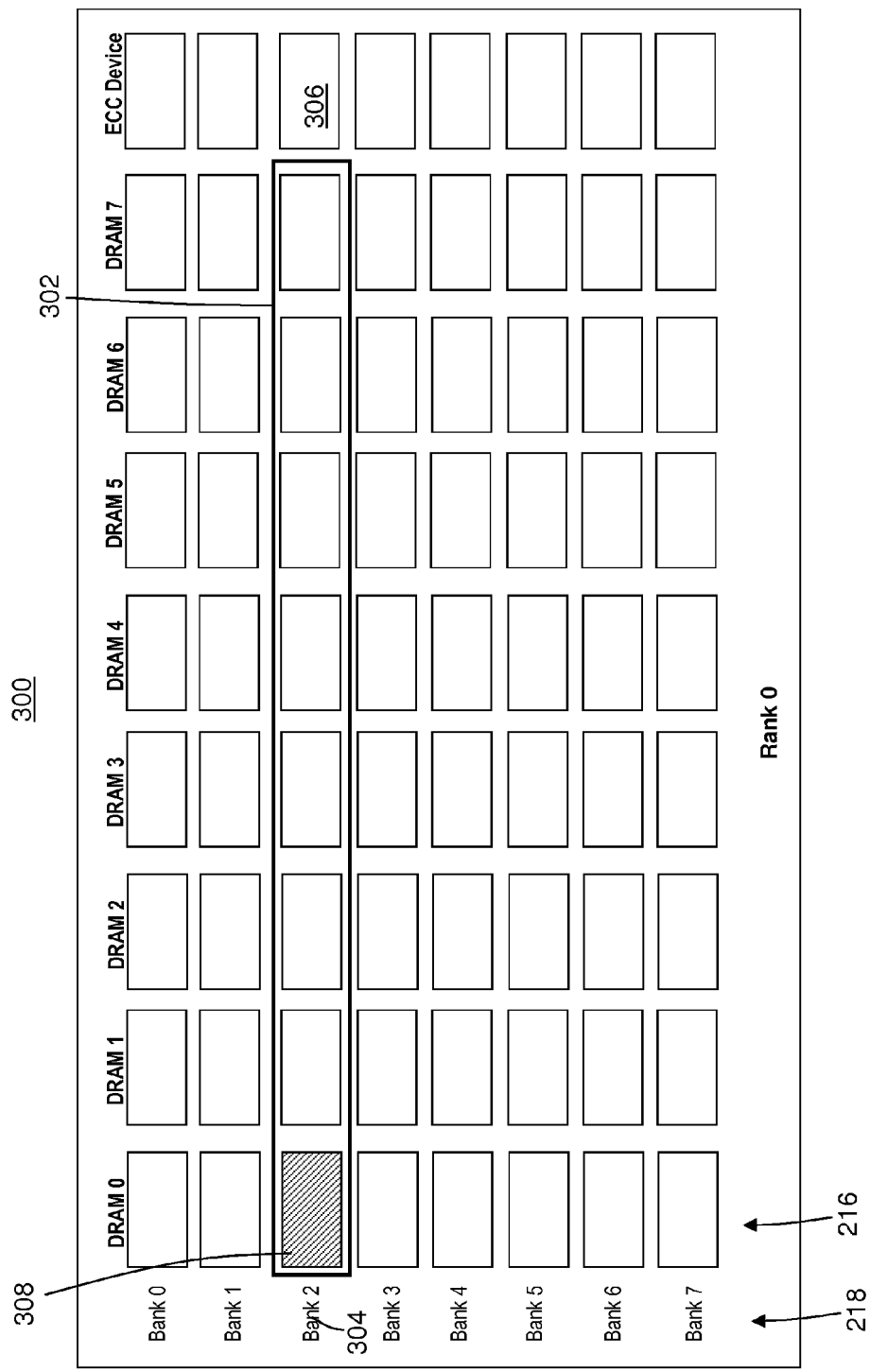
FIG. 3 illustrates an example of bank-level chip marking in accordance with an embodiment.

FIG. 3 illustrates an example of bank-level chip marking in accordance with an embodiment. A rank 300 in FIG. 3 is an embodiment of the rank 212A or 212B of FIG. 2. The rank 300 includes a plurality of memory devices 216 that are further divided into a plurality of banks 218 as previously described in reference to FIG. 2. In the example of FIG. 3, the memory devices 216 include eight DRAM devices labeled DRAM0-DRAM7 for data storage and one DRAM device for storing ECC values. A bank failure 302 may be detected by the ECC decoder 222 of FIG. 2 by comparing an ECC calculation across a bank number 304 of the rank 300 with a stored ECC value 306 for the bank number 304. Based on determining that the bank failure 302 includes a first error 308 in a first memory device DRAM0, a bank-level chip mark can be set in the mark array 224 of FIG. 2 identifying the rank 300, memory device DRAM0 of the memory devices 216, and bank2 as the bank number 304. The first error 308 may be a single or multiple bit difference that is isolated to a single bank number of one of the memory devices 216. A bank-level chip mark isolates declaration of an error condition to a bank number. A bank-level fault management action can be performed based on a bank-level chip mark to accommodate the error condition.

In the example of FIG. 3, since there is only a single error (first error 308), the ECC decoder 222 of FIG. 2 can be used to recover the correct data in combination with the ECC value 306. Rather than attempting to use ECC-based correction for all banks 218 of DRAM0, exemplary embodiments limit the ECC-based correction to the bank number 304 that is marked with a bank-level chip mark in the mark array 224 of FIG. 2.

Figure 4:
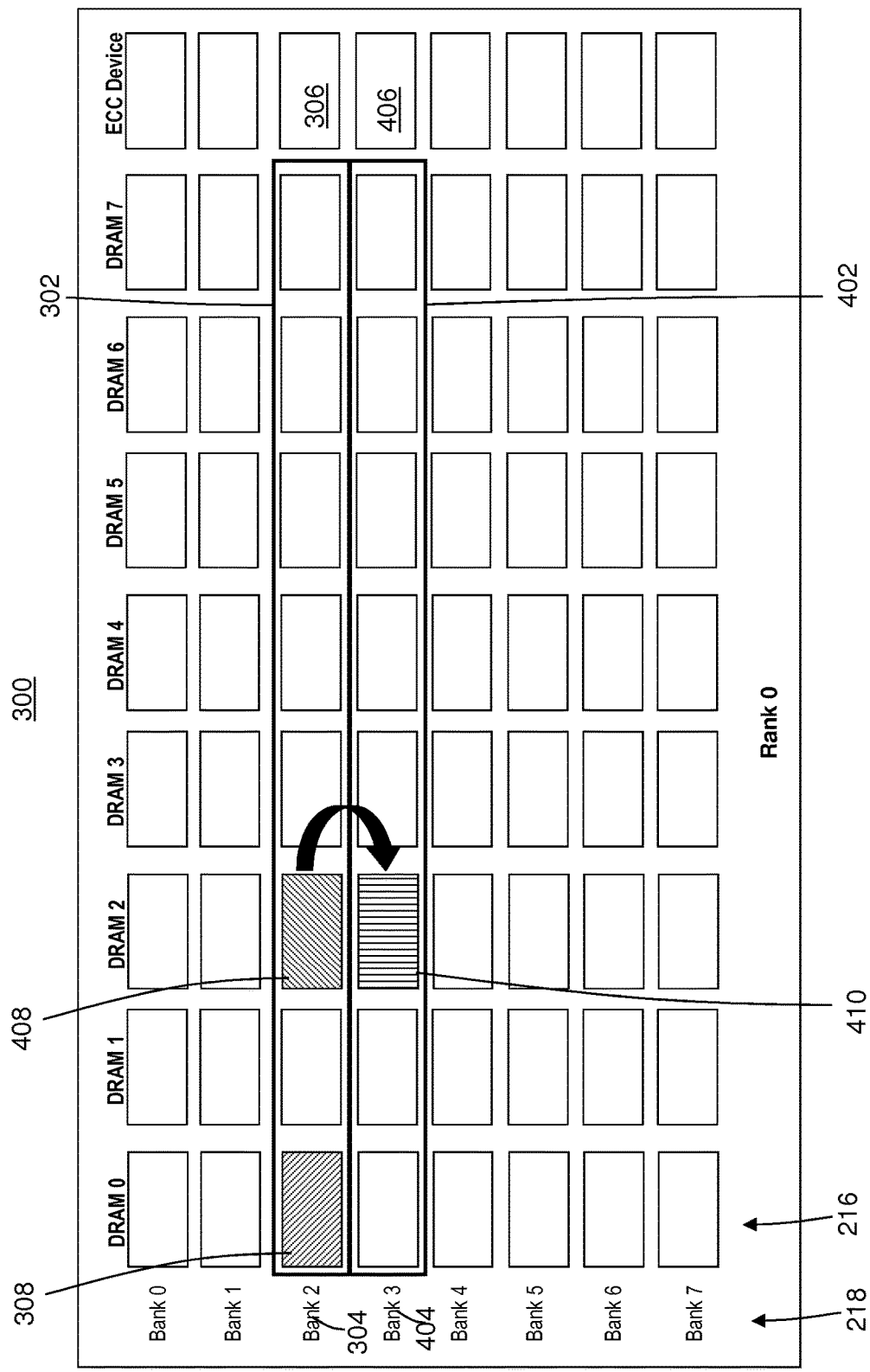
FIG. 4 illustrates an example of bank steering in accordance with an embodiment.

FIG. 4 illustrates an example of bank steering in accordance with an embodiment. The rank 300 in FIG. 4 includes a second error 408 in addition to the first error 308. In this example, the second error 408 is in the same bank number 304 as the first error 308. The ECC decoder 222 of FIG. 2 may use the ECC value 306 to detect both the first error 308 and the second error 408 but may not be capable of correcting multiple failures in the same bank number 304 across multiple memory devices 216, where the first error 308 is in a first memory device DRAM0 and the second error 408 is in a second memory device DRAM2. The existence of the first and second errors 308 and 408 can be captured in the mark array 224 of FIG. 2.

In an exemplary embodiment, the command control sequencer 220 of FIG. 2 can identify a non-faulty bank 410 available at a second bank number 404 (e.g., bank3), and the bank steering mux logic 210 of FIG. 2 can be used to steer access requests for the first bank number 304 (i.e., bank2) of the second memory device DRAM2 to the non-faulty bank 410 having the second bank number 404. The non-faulty bank 410 need not be spare memory that is otherwise unused; rather, the non-faulty bank 410 may already be in use for data storage as part of the second bank number 404. Since the contents of the non-faulty bank 410 are overwritten by data associated with the first bank number 304 of the second memory device DRAM2, an attempt to access (e.g., read) the data in the second bank number 404 across rank 300 will result in a bank failure 402 indication as the ECC value 406 will no longer align with data values for the second bank number 404 across rank 300. The ECC decoder 222 of FIG. 2 can be used to generate recovery data associated with the non-faulty bank 310 having the second bank number 404 after being overwritten by data associated with the first bank number 304 of the second memory device DRAM2. Thus, effectively two errors can be corrected without dedicated spare memory. Although the example of FIG. 4 includes the non-faulty bank 310 in the second memory device DRAM2, embodiments are not so constrained. Furthermore, numerical references such as "first" and "second" are not intended to imply that only specific memory devices 216 can be used. To the contrary, any of the memory devices 216 can implement bank-level fault management, where "first error" indicates a first detected error and "second error" indicates a second detected error.

Figure 5:
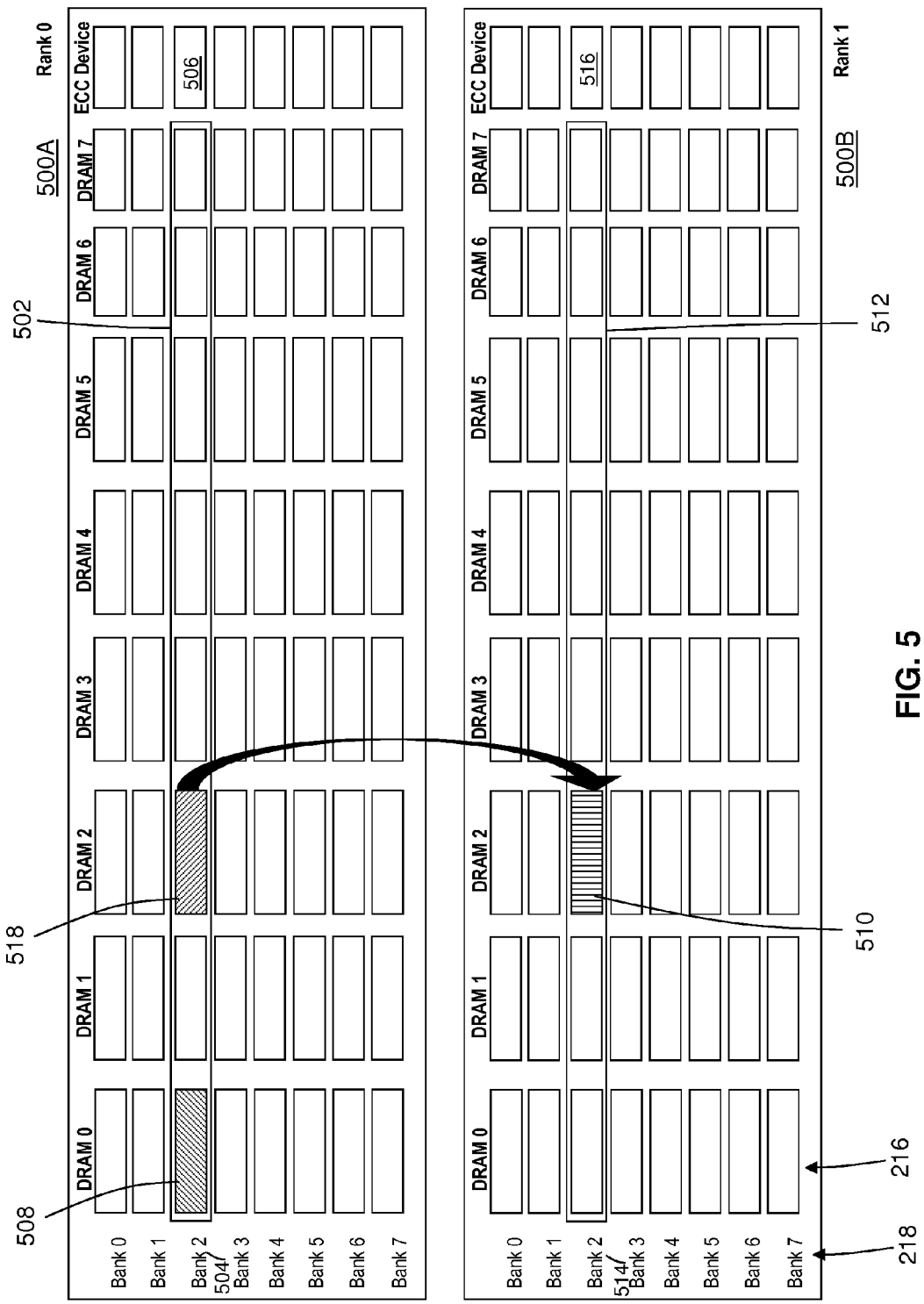
FIG. 5 illustrates another example of bank steering in accordance with an embodiment.

FIG. 5 illustrates another example of bank steering in accordance with an embodiment. In the example of FIG. 5, the ranks 500A and 500B may be located on the same memory module or on physically separate memory modules, such as ranks 212A and 212B of FIG. 2 on memory modules 214A and 214B. The ranks 500A and 500B include a plurality of memory devices 216 that are further divided into a plurality of banks 218 as previously described in reference to FIG. 2. In the example of FIG. 5, the memory devices 216 include eight DRAM devices labeled DRAM0-DRAM7 for data storage and one DRAM device for storing ECC values per rank 500. A bank failure 502 in rank 500A may be detected by the ECC decoder 222 of FIG. 2 by comparing an ECC calculation across a bank number 504 of the rank 500A with a stored ECC value 506 for the bank number 504. Based on determining that the bank failure 502 includes a first error 508 in a first memory device DRAM0, a bank-level chip mark can be set in the mark array 224 of FIG. 2 identifying the rank 500A, memory device DRAM0 and bank2 as the bank number 504. The first error 508 may be a single or multiple bit difference that is isolated to a single bank number of a single memory device 216. The ECC decoder 222 of FIG. 2 can be used to recover the correct data for the first error 508 in combination with the ECC value 506.

The rank 500A in FIG. 5 includes a second error 518 in addition to the first error 508. In this example, the second error 518 is in the same bank number 504 as the first error 508. The ECC decoder 222 of FIG. 2 may use the ECC value 506 to detect both the first error 508 and the second error 518 but may not be capable of correcting multiple failures in the same bank number 504 across multiple memory devices 216, where the first error 508 is in a first memory device DRAM0 and the second error 518 is in a second memory device DRAM2. The existence of the first and second errors 508 and 518 can be captured in the mark array 224 of FIG. 2. In an exemplary embodiment, the command control sequencer 220 of FIG. 2 can identify a non-faulty bank 510 available at a second bank number 514 (e.g., bank2) of second rank 500B, and the bank steering mux logic 210 of FIG. 2 can be used to steer access requests for the first bank number 504 (i.e., bank2) of the second memory device DRAM2 to the non-faulty bank 510 having the second bank number 514. In this example, both the bank numbers 504 and 514 are the same, i.e., bank2, for their respective ranks 500A and 500B; however, each of the ranks 500A and 500B is formed of separate groups of the memory devices 216.

Since the contents of the non-faulty bank 510 are overwritten by data associated with the first bank number 504 of the second memory device DRAM2, an attempt to access (e.g., read) the data in the second bank number 514 of rank 500B will result in a bank failure 512 indication as ECC value 516 will no longer align with data values for the second bank number 514 across the rank 500B. The ECC decoder 222 of FIG. 2 can be used to generate recovery data associated with the non-faulty bank 510 having the second bank number 514 after being overwritten by data associated with the first bank number 504 of the second memory device DRAM2. Thus, effectively two errors can be corrected without dedicated spare memory.

Figure 6:
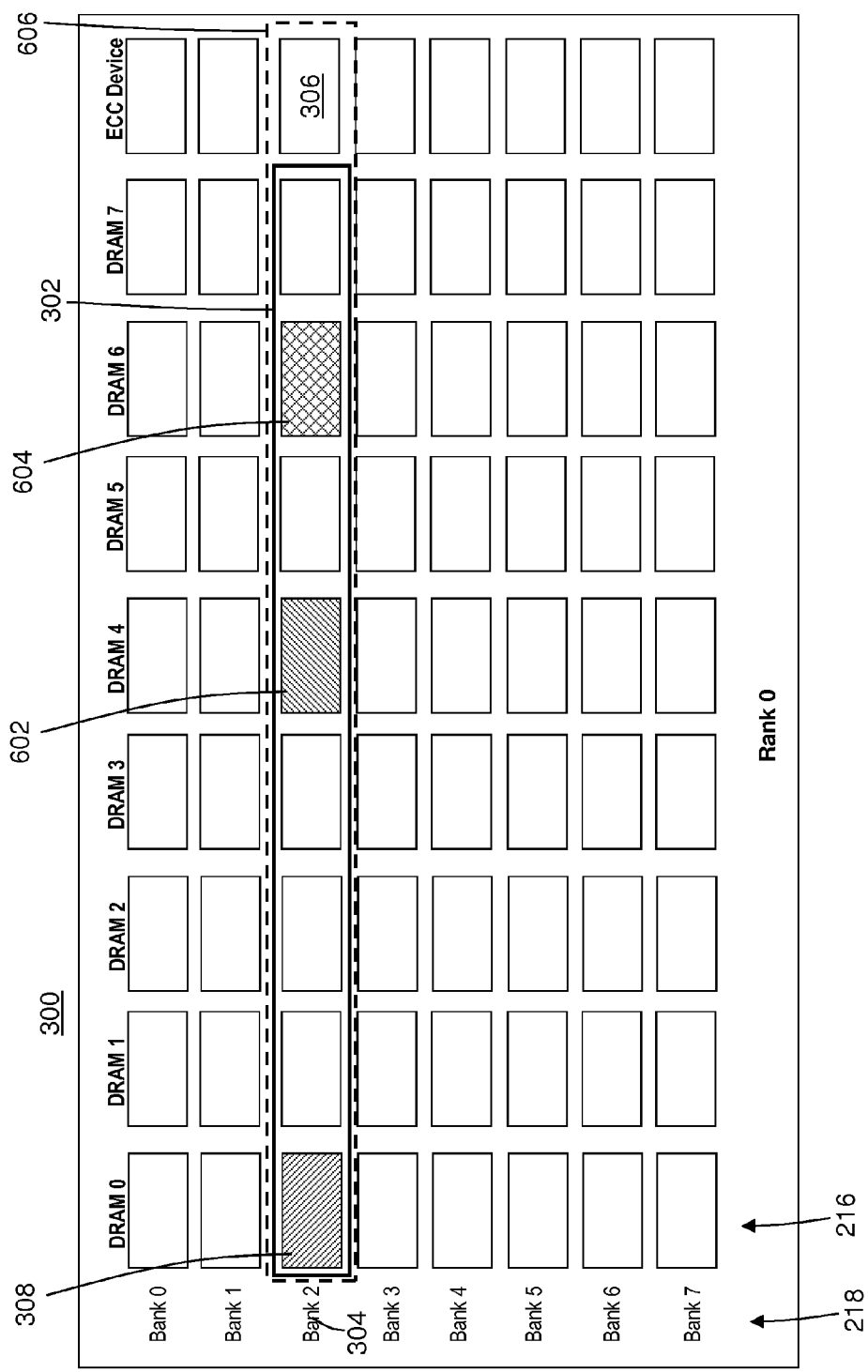
FIG. 6 illustrates an example of a bank callout in accordance with an embodiment.

In a rank, if ECC is already protecting a failed bank due to a first error 308 (e.g., bank-level for bank2), then any other bank failure in the same bank level (bank2) cannot be protected by ECC. In such a scenario, the bank level can be called out from operation, which is referred to herein as "bank callout". FIG. 6 illustrates an example of a bank callout in accordance with an embodiment. The rank 300 in FIG. 6 includes a second error 602 in memory device DRAM4 and a third error 604 in memory device DRAM6, in addition to a first error 308 in memory device DRAM0. In this example, the second error 602 and the third error 604 are in the same bank number 304 as the first error 308 but occur at a later point in time. Thus, the second error 602 and the third error 604 represent a subsequent error condition detected after the first error 308 at the same bank number 304 having a bank-level chip mark. Since ECC is in use to for the first error 308, the second error 602 and third error 604 cannot be corrected by ECC for a bank failure 302 having the same bank number 304. The ECC decoder 222 of FIG. 2 may use the ECC value 306 to detect the first, second, and third errors 308, 602, and 604. The existence of the first, second, and third errors 308, 602, and 604 can be captured in the mark array 224 of FIG. 2. Bank-level chip marks can be replaced with a bank mark in the mark array 224 of FIG. 2 to prevent any use of bank2 in rank 300. For example, based on determining that the second and third errors 602 and 604 exist in the first bank number 304 of memory devices DRAM4 and DRAM6 of the rank 300, the first bank number 304 is marked as a faulty bank 606 in mark array 224 of FIG. 2.

The command control sequencer 220 of FIG. 2 can support address range de-allocation for an address space of the faulty bank 606. An operating system (not depicted) can de-allocation for an address space of the faulty bank 606 such that application programs do not attempt to access the storage area in bank2 of rank 300. Where an error is isolated to a particular bank number, the remaining bank numbers can still be accessible, i.e., banks0, 1, and 3-7, while the address space of bank2 is inaccessible. This keeps more storage available for use rather than de-allocating the entire rank 300.

Figure 7:
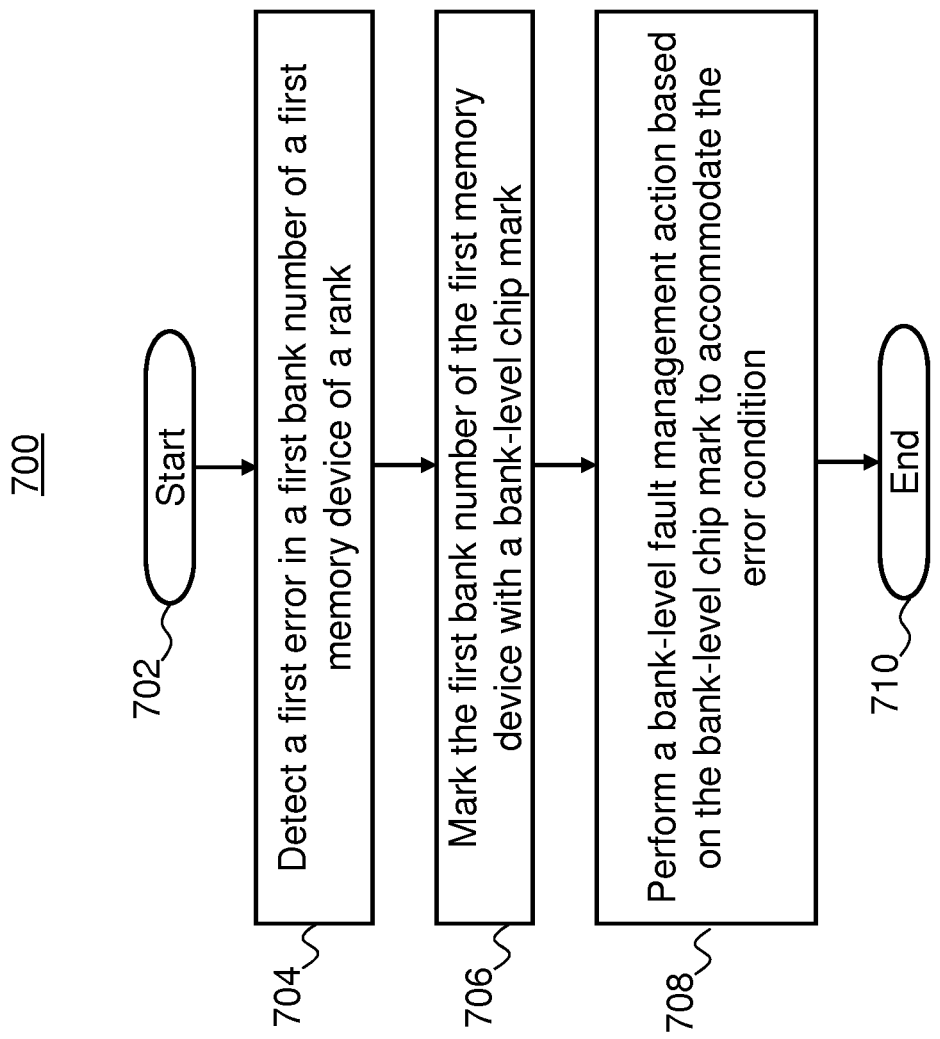
FIG. 7 illustrates a flow diagram of a method for performing bank-level fault management in accordance with an embodiment.

FIG. 7 illustrates a flow diagram of a method 700 for performing bank-level fault management in accordance with an embodiment. The depicted blocks may be part of or in addition to another process and/or may be performed in any suitable order to provide bank-level fault management. In an embodiment, commands for the blocks are performed by the memory buffer device 202 of FIG. 2. The method 700 can be implemented for a variety of memory system configurations and is described in reference to FIGS. 1-7.

At block 702, the method 700 begins. At block 704, a first error 308 is detected in a first bank number 304 of a first memory device DRAM0 of a rank 300. The ECC decoder 222 may detect the first error 308 in conjunction with the stored ECC value 306. At block 706, the first bank number 304 of the first memory device DRAM0 is marked with a bank-level chip mark in the mark array 224 based on detecting the first error 308. The bank-level chip mark isolates declaration of an error condition to the first bank number 304. At block 708, a bank-level fault management action is performed based on the bank-level chip mark to accommodate the error condition.

Bank-level fault management actions can include correcting the first error 308 using an error-correcting code decoder, such as the ECC decoder 222 of FIG. 2, and/or taking additional actions as other errors are detected. For instance, a second error 408 may be detected in the first bank number 304 of a second memory device DRAM2 of the rank 300. Based on determining that a non-faulty bank 410 is available at a second bank number 404, access requests for the first bank number 304 of the second memory device DRAM2 can be steered to the non-faulty bank 410 having the second bank number 404. Similarly, the method 700 applies to the first bank number 504 of the first memory device DRAM0 of rank 500A, the second error 518 in the first bank number 504 of the second memory device DRAM2 of the rank 500A, and the non-faulty bank 510 at the second bank number 514 of rank 500B.

The first error 308, 508 may be corrected using the ECC decoder 222 of FIG. 2. When an access request for the second bank number 404, 514 is received, the ECC decoder 222 is used to generate recovery data associated with the non-faulty bank 410, 510 having the second bank number 404, 514 after being overwritten by data associated with the first bank number 304, 504 of the second memory device DRAM2. The non-faulty bank 410 may have the second bank number 404 located in the second memory device DRAM2 where bank steering is within the same rank 300. The non-faulty bank 510 may be located on a second rank 500B where bank steering is between ranks 500A and 500B. The rank 500A and the second rank 500B may be located on separate memory modules (e.g., memory modules 214A and 214B) coupled to a memory buffer device 202 that controls bank steering between the rank 500A and the second rank 500B, which may be equivalent to ranks 212A and 212B of FIG. 2. Based on detecting a subsequent error condition (e.g., second error 602, third error 604, and/or other errors) at the first bank number 304 including the bank-level chip mark, the first bank number 304 can be marked as a faulty bank 606. Address range de-allocation may be supported for an address space of the faulty bank 606, such that an operating system can request de-allocation of the faulty bank 606. At block 710, the method 700 ends.

Technical effects include performing bank-level fault management in a memory system. Tracking errors at an internal bank-level can enhance memory system reliability, availability, and serviceability by leveraging an ECC decoder to identify bank level errors in memory devices and keep other banks available for use. Bank-level chip marking, bank steering, and bank callout can be further extended to three-dimensional memory systems, such as memory stacks or memory cubes.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A memory system, comprising:
    a plurality of ranks, each rank comprising a plurality of memory devices each having a plurality of banks; and
    a memory buffer device coupled to at least one of the ranks, the memory system configured to:
        detect a first error in a first bank number of a first memory device of a rank;
        mark the first bank number of the first memory device with a bank-level chip mark, the bank-level chip mark isolating declaration of an error condition to the first bank number;
        detect a second error in the first bank number of a second memory device of the rank;
        based on a determination that a non-faulty bank is available at a second bank number, overwrite in-use data storage of the second bank number with data associated with the first bank number of the second memory device and steer access requests for the first bank number of the second memory device to the non-faulty bank having the second bank number; and
        perform a bank-level fault management action based on the bank-level chip mark to accommodate the error condition by accessing the second bank number to accommodate the second error and correcting the first error using an error-correcting code decoder in combination with accessing the first bank number and the second bank number.

2. The memory system of claim 1, wherein the memory system is further configured to:
receive an access request for the second bank number; and
use the error-correcting code decoder to generate recovery data associated with the in-use data storage of the non-faulty bank having the second bank number after being overwritten by the data associated with the first bank number of the second memory device.

3. The memory system of claim 1, wherein the non-faulty bank having the second bank number is located in the second memory device.

4. The memory system of claim 1, wherein the non-faulty bank is located on a second rank.

5. The memory system of claim 4, wherein the rank and the second rank are located on separate memory modules coupled to the memory buffer device that controls bank steering between the rank and the second rank.

6. The memory system of claim 1, wherein the memory system is further configured to:
mark the first bank number as a faulty bank based on detecting a subsequent error condition at the first bank number comprising the bank-level chip mark; and
support address range de-allocation for an address space of the faulty bank.

\* \* \* \* \*